United States Patent
Urushihata

(10) Patent No.: US 9,335,918 B2
(45) Date of Patent: May 10, 2016

(54) PORTABLE ELECTRONIC APPARATUS

(75) Inventor: Mutsumi Urushihata, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 347 days.

(21) Appl. No.: 13/352,478

(22) Filed: Jan. 18, 2012

(65) Prior Publication Data

US 2012/0182240 A1 Jul. 19, 2012

(30) Foreign Application Priority Data

Jan. 18, 2011 (JP) ................. 2011-008040

(51) Int. Cl.
- *G06F 1/16* (2006.01)
- *G06F 3/044* (2006.01)
- *G06F 3/0488* (2013.01)
- *G06F 3/041* (2006.01)

(52) U.S. Cl.
CPC ............ *G06F 3/0488* (2013.01); *G06F 1/1626* (2013.01); *G06F 1/1692* (2013.01); *G06F 3/0412* (2013.01); *G06F 3/04883* (2013.01); *G06F 1/1616* (2013.01); *G06F 1/1647* (2013.01); *G06F 1/1656* (2013.01); *G06F 2200/1614* (2013.01); *H04M 2250/16* (2013.01)

(58) Field of Classification Search
CPC ... G06F 1/1615; G06F 1/1635; G06F 1/1626; G06F 1/1616; G06F 1/1656; G06F 3/0412; G06F 1/1647; G06F 3/04883; H04M 2250/16
USPC .............. 345/901, 905, 1.1, 169; 361/679.02; 379/433.01; 715/864
See application file for complete search history.

(56) References Cited

U.S. PATENT DOCUMENTS

| | | | | |
|---|---|---|---|---|
| 6,157,958 A | * | 12/2000 | Armitage et al. | 709/250 |
| 6,165,142 A | * | 12/2000 | Bar | 600/595 |
| 7,728,812 B2 | | 6/2010 | Sato et al. | |
| 8,239,130 B1 | * | 8/2012 | Upstill et al. | 701/426 |
| 8,432,368 B2 | * | 4/2013 | Momeyer et al. | 345/173 |
| 8,521,229 B2 | | 8/2013 | Naruse | |
| 8,560,011 B2 | | 10/2013 | Fujimoto | |
| 2001/0012000 A1 | * | 8/2001 | Eberhard | 345/173 |
| 2005/0176486 A1 | * | 8/2005 | Nishimura et al. | 463/4 |

(Continued)

FOREIGN PATENT DOCUMENTS

| | | |
|---|---|---|
| JP | 2002-318640 A | 10/2002 |
| JP | 2006-18794 A | 1/2006 |

(Continued)

OTHER PUBLICATIONS

Woodson, et al.,Human Factors Design Handbook, 2nd Ed. 1982, McGraw Hill, p. 419 and p. 511.*

(Continued)

*Primary Examiner* — Michael J Eurice
(74) *Attorney, Agent, or Firm* — Hauptman Ham, LLP

(57) ABSTRACT

According to an aspect, a portable electronic apparatus includes a portable electronic apparatus includes a housing, a display unit, an operation unit, and a control unit. The housing includes a first surface, a second surface that is opposite the first surface, and a convex section that is formed on an edge area of the second surface. The display unit is arranged on the first surface. The operation unit is arranged on the first surface. The control unit controls the display unit and the operation unit.

18 Claims, 6 Drawing Sheets

(56) References Cited

U.S. PATENT DOCUMENTS

| | | |
|---|---|---|
| 2009/0015555 A1* | 1/2009 | Takashima et al. ............ 345/158 |
| 2009/0164035 A1* | 6/2009 | Zadesky et al. .................. 700/94 |
| 2009/0325607 A1* | 12/2009 | Conway et al. ............ 455/456.3 |
| 2010/0007510 A1* | 1/2010 | Ina et al. ................... 340/815.83 |
| 2011/0188179 A1* | 8/2011 | Myers ................... G06F 1/1626 |
| | | 361/679.01 |
| 2011/0234487 A1 | 9/2011 | Hiramoto |

FOREIGN PATENT DOCUMENTS

| | | |
|---|---|---|
| JP | 2006243521 A | 9/2006 |
| JP | 2007-41717 A | 2/2007 |
| JP | 2009-176020 A | 8/2009 |
| JP | 2010-113503 A | 5/2010 |
| JP | 2010-124379 A | 6/2010 |
| WO | 2009/158685 A2 | 12/2009 |
| WO | 2010/024357 A1 | 3/2010 |
| WO | 2010/071188 A1 | 6/2010 |

OTHER PUBLICATIONS

Office Action mailed Sep. 2, 2014, corresponding to Japanese patent application No. 2011-008040.

Office Action mailed Mar. 31, 2015, corresponding to Japanese patent application No. 2011-008040.

* cited by examiner

PORTABLE ELECTRONIC APPARATUS

This application claims priority from Japanese Application No. 2011-008040, filed on Jan. 18, 2011, the content of which is incorporated by reference herein in its entirety.

BACKGROUND

1. Technical Field

The present disclosure relates to a portable electronic apparatus that includes a display unit.

2. Description of the Related Art

A type of portable electronic apparatus has a display unit arranged on substantially the entire area of the front surface. For example, Japanese Patent Application Laid-Open No. 2006-243521 describes a portable electronic apparatus that uses electronic paper as a display panel to display texts and figures. There are mobile phones called "Smartphones" that have a touch-panel display unit.

With a portable electronic apparatus that has a display unit arranged on substantially the entire area of the front surface, a user can perform an input operation with his/her one hand while holding the housing of the portable electronic apparatus with the other hand. In other words, the user can perform an input operation even when the portable electronic apparatus is not placed on a desk. However, because the above input operation needs both hands, depending on a situation, it can be difficult to perform an input operation or even impossible when one hand is not available.

For the foregoing reasons, there is a need for a portable electronic apparatus that allows a user to perform an input operation easily, while holding the housing.

SUMMARY

According to an aspect, a portable electronic apparatus includes a portable electronic apparatus includes a housing, a display unit, an operation unit, and a control unit. The housing includes a first surface, a second surface that is opposite the first surface, and a convex section that is formed on an edge area of the second surface. The display unit is arranged on the first surface. The operation unit is arranged on the first surface. The control unit controls the display unit and the operation unit.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components. The present invention can be applied to any type of portable electronic apparatuses, including but not limited to mobile phones, personal handyphone systems (PHS), personal digital assistants (PDA), portable navigation units, personal computers (including but not limited to tablet computers, netbooks etc.), media players, portable electronic reading devices, and gaming devices.

Figure 1:
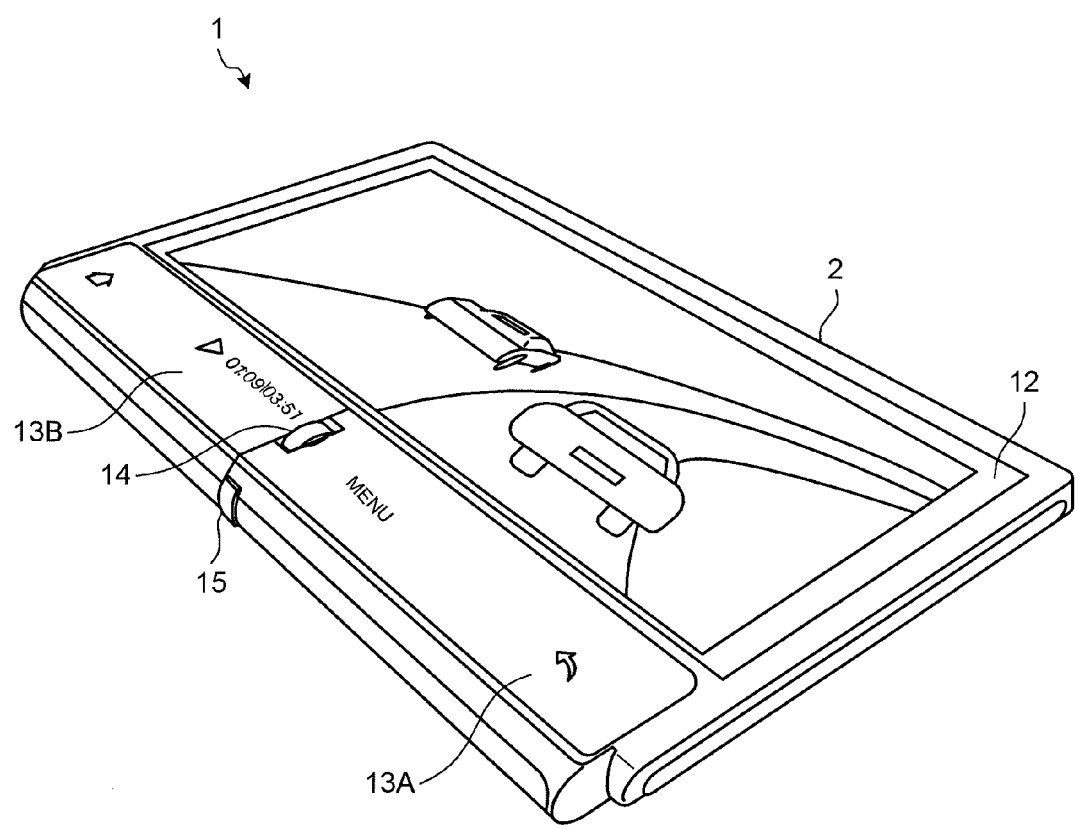
FIG. 1 is a schematic perspective view of a portable electronic apparatus according to an embodiment.
Figure 2:
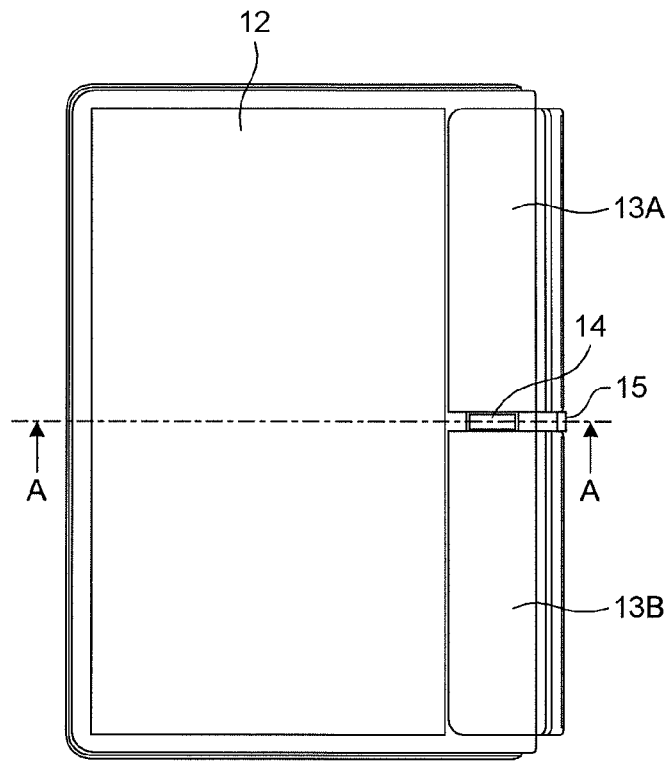
FIG. 2 is a front view of the portable electronic apparatus illustrated in FIG. 1.
Figure 3:
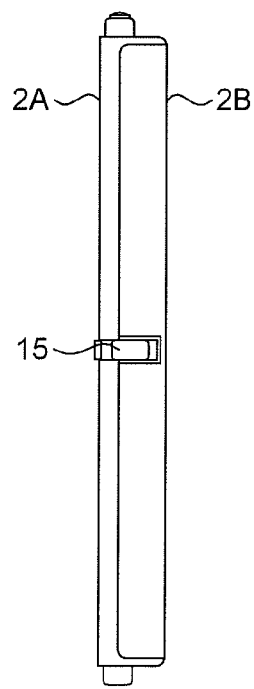
FIG. 3 is a side view of the portable electronic apparatus illustrated in FIG. 1, more particularly, a longitudinal side surface of the portable electronic apparatus.
Figure 4:
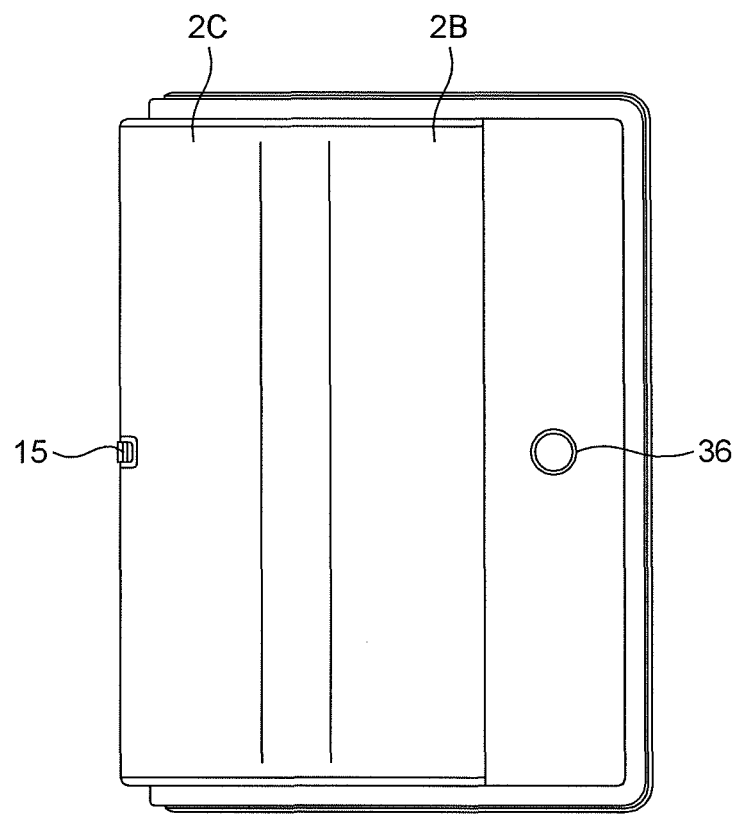
FIG. 4 is a back view of the portable electronic apparatus illustrated in FIG. 1.
Figure 5:
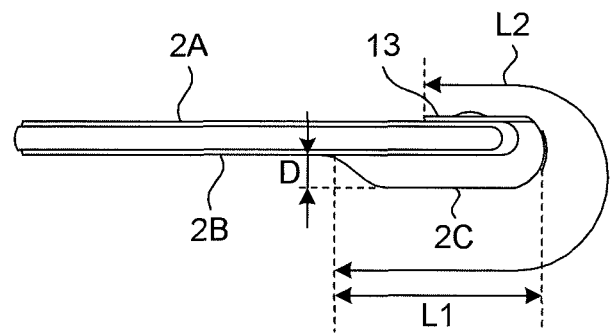
FIG. 5 is a side view of the portable electronic apparatus illustrated in FIG. 1, more particularly, a lateral side surface of the portable electronic apparatus.
Figure 6:
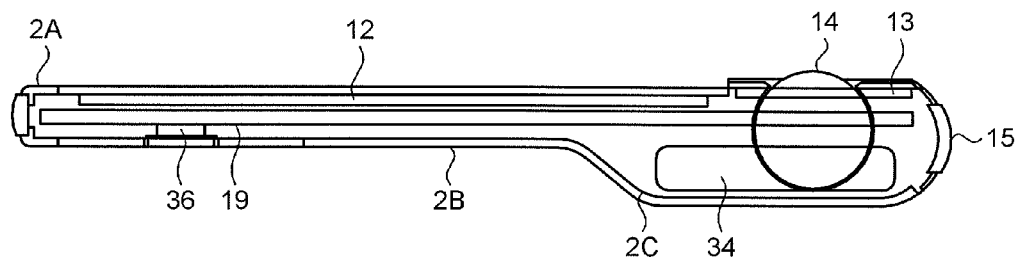
FIG. 6 is a cross-sectional view of the portable electronic apparatus cut along the A-A line of FIG. 2.

The overall configuration of a portable electronic apparatus 1 will be explained with reference to FIGS. 1 to 6. FIG. 1 is a schematic perspective view of a portable electronic apparatus according to an embodiment. FIG. 2 is a front view of the portable electronic apparatus illustrated in FIG. 1. FIG. 3 is a side view of the portable electronic apparatus illustrated in FIG. 1, more particularly, a longitudinal side surface of the portable electronic apparatus. FIG. 4 is a back view of the portable electronic apparatus illustrated in FIG. 1. FIG. 5 is a side view of the portable electronic apparatus illustrated in FIG. 1, more particularly, a lateral side surface of the portable electronic apparatus. FIG. 6 is a cross-sectional view of the portable electronic apparatus cut along the A-A line of FIG. 2.

As illustrated in FIGS. 1 to 5, a housing 2 of the portable electronic apparatus 1 has an elongated plate shape, i.e., a rectangular shape having a predetermined thickness. Either surface of surfaces of the housing 2 that have the largest area (rectangular-shaped surfaces) is a front surface (first surface) 2A and the other surface is a back surface (second surface) 2B. Surfaces of the housing 2 that correspond to the predetermined thickness (surfaces that connect the front surface and the back surface) are side surfaces.

A finger rest section (convex section) 2C is formed on the back surface 2B of the housing 2. Because, for example, the user puts his/her finger on the section, the convex section is called "finger rest section". The finger rest section 2C is a (convex-shaped) protrusion that protrudes from the back surface 2B (goes away from the front surface 2A) and that is formed near an edge of a longitudinal side surface. In other words, the finger rest section 2C is a convex-shaped member that extends from end to end over the back surface 2B in the longitudinal direction and that is formed along an edge near a longitudinal side surface. As illustrated in FIG. 5, the angle between the plane of one area of an edge of the finger rest section 2C that is closer to the center of the back surface 2B and that extends in the longitudinal direction (an edge of the finger rest section 2C that extends in the longitudinal direction and that is closer to the center of the back surface 2B) and the plane of the other area of the back surface 2B (area on which the finger rest section 2C is not formed) is obtuse (greater than 90 degrees). As illustrated in FIG. 5, the finger rest section 2C is, if a certain portion is excluded, a plane that is parallel to the back surface 2B. As described above, the surface of the finger rest section 2C illustrated in FIG. 5 (surface parallel to the lateral direction) is formed in a substantially trapezoidal shape. The finger rest section 2C is a portion on which, when the user holds the housing 2, he/she puts the end of a finger. With this configuration, the user can put his/her finger (the end of his/her finger, etc.,) on a slope portion of an edge of the finger rest section 2C that is closer to the center of the back surface 2B and that extends in the longitudinal direction.

The housing 2 has the above shape and has the finger rest section 2C that is formed near an edge of the back surface 2B in the lateral direction such that it extends in the longitudinal direction. Therefore, regarding the housing 2, the thickness of one area on which the finger rest section 2C is formed is greater than the thickness of the other area. An edge of the finger rest section 2C in the lateral direction that is closer to the center forms a step.

The units of the portable electronic apparatus 1 provided on the housing 2 will be explained below with reference to FIGS. 1 to 6. A first touch panel 12, a second touch panel 13, and a first operation unit 14 are arranged on the front surface 2A of the housing 2. The shape of the first touch panel 12 is a rectangular that has short sides extending in the lateral direction of the front surface 2A and long sides extending in the longitudinal direction of the front surface 2A. The first touch panel 12 occupies almost the entire area of the front surface 2A except an area that faces the finger rest section 2C. In other words, the first touch panel 12 extends in the longitudinal direction over substantially the entire front surface 2A and occupies an area excluding, in the lateral direction, a certain edge area near the side surface along which the finger rest section 2C is formed. The shape of the second touch panel 13 is a rectangular that has short sides extending in the lateral direction of the front surface 2A and long sides extending in the longitudinal direction of the front surface 2A. The second touch panel 13 is included in the front surface 2A and occupies substantially the entire area that faces the finger rest section 2C. In other words, the second touch panel 13 extends in the longitudinal direction over substantially the entire front surface 2A and occupies, in the lateral direction, the certain edge area near the side surface along which the finger rest section 2C is formed. The second touch panel 13 is separated, by the center of the front surface 2A in the longitudinal direction, into two areas including a first area 13A and a second area 13B.

The first touch panel 12 and the second touch panel 13 display thereon texts, figures, images, etc., and detect various operations performed by a user with his/her finger(s), a stylus, or the like (in the description herein below, for the sake of simplicity, it is assumed that the user touches the first touch panel 12 and the second touch panel 13 with his/her finger(s)) on the touch panels. In other words, the first touch panel 12 and the second touch panel 13 have two functions including an image displaying function (as a display unit) and an operation detecting function (as an operation unit). As illustrated in FIG. 1, the portable electronic apparatus 1 of the present embodiment displays videos and images mainly on the first touch panel 12 and an operation menu (including, e.g., a size-increasing key, a size-decreasing key, a home key, a menu key, etc.,) mainly on the second touch panel 13.

The first operation unit 14 is disposed between the first area 13A and the second area 13B. In other words, the first operation unit 14 is disposed in the center of the front surface 2A in the longitudinal direction and in the area that faces the finger rest section 2C. The first operation unit 14 is a physical key that rotates by a rotation axis that is parallel to the longitudinal direction of the front surface 2A. The first operation unit 14 rotates in the lateral direction of the front surface 2A. As described above, the first operation unit 14 is a dial key.

The housing 2 has a second operation unit 15 on a side surface along which the finger rest section 2C is formed. The second operation unit 15 is disposed in the center of the side surface in the longitudinal direction. In other words, the second operation unit 15 is adjacent to the first operation unit 14. The second operation unit 15 is a physical key that detects a push operation. When pushed down, the second operation unit 15 is moved toward the lateral direction of the front surface 2A.

The housing 2 has a camera 36 on the back surface 2B. The camera 36 is arranged near an edge of the back surface 2B that is opposite to the edge along which the finger rest section 2C is formed. In other words, the camera 36 is arranged in the center of the back surface 2B in the longitudinal direction and on an edge in the lateral direction that is opposite to the edge on which the finger rest section 2C is arranged.

The internal configuration of the portable electronic apparatus 1 will be explained below with reference to FIG. 6. As illustrated in FIG. 6, inside the housing 2 are arranged the first touch panel 12, the second touch panel 13, the first operation unit 14, the second operation unit 15, a circuit substrate 19, a battery 34, and the camera 36. The arrangement positions and the configuration of the first touch panel 12, the second touch panel 13, the first operation unit 14, and the second operation unit 15 are explained above; therefore, the same explanation is not repeated.

The circuit substrate 19 is a substrate for mounting electronic components thereon that have the functions of a later-described control unit 22, a later-described storage unit 24, etc., such as a central processing unit (CPU), a memory, etc. The circuit substrate 19 is disposed closer to the back surface 2B than the first touch panel 12 and the second touch panel 13. The battery 34 is accommodated in the finger rest section 2C. In other words, the battery 34 is disposed in an area that faces the second touch panel 13 of the housing 2 and closer to the back surface 2B than the second touch panel 13.

Figure 7:
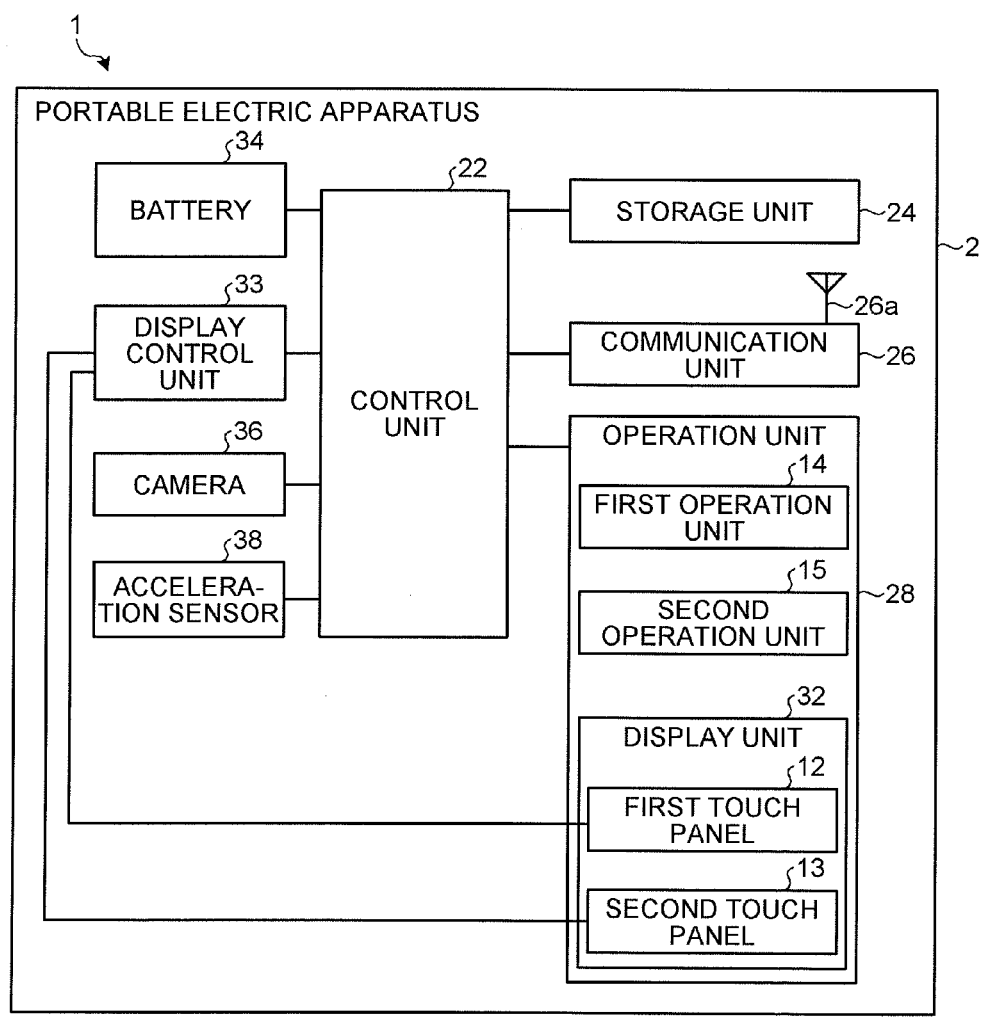
FIG. 7 is a block diagram of the portable electronic apparatus.

The relation between the functions of the portable electronic apparatus 1 and the control unit will be explained below. FIG. 7 is a block diagram of the portable electronic apparatus illustrated in FIG. 1. As illustrated in FIG. 7, the portable electronic apparatus 1 includes the control unit 22, the storage unit 24, a communication unit 26, an operation unit 28, a display unit 32, a display control unit 33, the battery 34, the camera 36, and an acceleration sensor (detector) 38. The portable electronic apparatus 1 may further include a microphone, a receiver, a speaker, etc.

The control unit 22 is a processing unit that integrally controls the operations of the portable electronic apparatus 1. The control unit 22 is, for example, a CPU. In other words, the control unit 22 controls the operations of the communication unit 26, the display unit 32, etc., so that various processes of the portable electronic apparatus 1 are executed in an order appropriate to the operation of the operation unit 28 and the software stored in the storage unit 24 of the portable electronic apparatus 1. The control unit 22 performs processes in accordance with a program stored in the storage unit 24 (e.g., an operating system program, an application program, etc.).

The storage unit 24 stores therein software and data that are used in a process performed by the control unit 22. For example, the storage unit 24 stores therein a program that is used for controlling an image to be displayed on the display unit 32 and a program that is used to send/receive an e-mail. The storage unit 24 also stores therein not only programs but also various data. For example, the storage unit 24 stores therein various setting conditions, dictionary data that is used for character conversion, video data that is displayed on the display unit 32, etc.

The communication unit 26 establishes, via a channel that is assigned by a base station via an antenna 26a, a wireless signal path based on the code-division multiple access (CDMA) system, or any other wireless communication protocols, with the base station, and performs information communications with the base station. Any other wired or wireless communication or network interfaces, e.g., LAN, Bluetooth, Wi-Fi, NFC (Near Field Communication) may also be included in lieu of or in addition to the communication unit 26.

The operation unit 28 includes the first touch panel 12, the second touch panel 13, the first operation unit 14, and the second operation unit 15. When a user performs an input operation on the touch panels or the operation unit, the operation unit 28 inputs the detail of the operation to the control unit 22.

As described above, the display unit 32 includes the first touch panel 12 and the second touch panel 13. The first touch panel 12 and the second touch panel 13 of the display unit 32 display a video, an image, and the like on the display device in accordance with data received from the control unit 22 via the display control unit 33. The battery 34 is a power supply that supplies an electric power to each unit of the portable electronic apparatus 1, such as the control unit 22.

The camera 36 is an image capturing device that acquires an image of an image capturing area that faces the back surface 2B (an area indicated by a predetermined angle of view). The camera 36 sends information containing a captured image to the control unit 22. The acceleration sensor 38 is a detector that detects the acceleration exerted on the housing 2. The acceleration sensor 38 detects the acceleration exerted on the housing 2, thereby detecting the orientation of the housing 2. A detector that detects the acceleration in various manners can be used as the acceleration sensor 38. For example, the detector used can be a detector that detects the acceleration by using a change in the capacitance, a change in the piezoresistance, a change in the relative position, etc.

As described above, because the finger rest section 2C is provided on the back surface 2B of the housing 2 of the portable electronic apparatus 1, when the user holds the housing 2 with one hand, the user can support the edge on which the finger rest section 2C is formed with his/her finger putting on the finger rest section 2C. With this configuration, the user can hold the housing 2 with his/her finger (any of the first, the second, the third, and the fourth fingers) putting on the finger rest section 2C and his/her thumb putting on the front surface 2A.

Moreover, because the second touch panel 13 of the operation unit 28 is arranged in the area of the front surface 2A that faces the finger rest section 2C, the user can perform, while holding the housing 2 with a hand, an input operation on the second touch panel 13 with a finger of the same hand. With this configuration, the user can perform an input operation, while holding the housing 2 with one hand. Moreover, because the second touch panel 13 is arranged in the area that is, when the user holds the housing 2, hidden partially by his/her hand (the area near the edge of the front surface 2A), as illustrated in FIG. 1, the screen of the first touch panel 12, which is larger than the screen of the second touch panel 13, is not hidden by the hand. With this configuration, because the operation unit is disposed in the area with which the user supports the housing 2 (area held by the user), the area of the front surface 2A is used efficiently for displaying an image and the like.

Moreover, because the first operation unit 14 is disposed between the first area 13A and the second area 13B of the second touch panel 13, the user can perform an input operation by using not only the second touch panel 13 but also the first operation unit 14. With this configuration, the user can perform, while holding the housing 2 with a hand, an input operation with a finger of the same hand to rotate the first operation unit 14. With this configuration, if, for example, an operation of rotating the first operation unit 14 is associated with a display-screen scroll operation, the user can change, while holding the housing 2 with one hand, a portion of the image to be displayed on the first touch panel 12.

Moreover, because the battery 34, which is heavy, is accommodated in the finger rest section 2C, the user can support the housing 2 of the portable electronic apparatus 1 easily with one hand. In other words, of the portable electronic apparatus 1, with respect to the lateral direction of the front surface 2A, the side on which the finger rest section 2C is arranged, i.e., the side on which the user holds the housing 2 with one hand, is heavier than the opposite side; therefore, the user can hold the housing 2 easily.

In the present embodiment, the battery 34 of the portable electronic apparatus 1 is accommodated in the finger rest section 2C. However, any configuration is allowable as long as the center of gravity of the portable electronic apparatus 1 is in a side in which the finger rest section 2C is arranged, more particularly, with respect to a direction perpendicular to the edge surface on which the finger rest section 2C is arranged, the center of gravity of the portable electronic apparatus 1 is at any position in one side from the center where the edge on which the finger rest section 2C is arranged. Because the center of gravity of the portable electronic apparatus 1 is in a side where the finger rest section 2C is arranged, when the user holds the side where the finger rest section 2C is arranged, he/she can easily hold the housing 2.

The control unit 22 of the portable electronic apparatus 1 displays, on the second touch panel 13, information that relates to an operation on a screen that is displayed on the first touch panel 12. With this configuration, if, as information that relates to an operation and that is to be displayed on the second touch panel 13 (operation menu), an operation menu of operations in associated with an image that is displayed on the first touch panel 12 is displayed, the user can perform an input operation in accordance with the display of the first touch panel 12.

The control unit 22 displays information indicative of at least one of the date, the time, the remaining battery level, and the radio field intensity on the second touch panel 13, i.e., uses the second touch panel 13 as something called "sub-display unit". With this configuration, it is possible to display an image on the second touch panel 13 and display only necessary information containing no image on the first touch panel 12, thereby reducing the consumed energy. Moreover, the control unit 22 can be configured to display, when the operation detecting function is in stop, information indicative of at least one of the time, the remaining battery level, and the radio field intensity on the second touch panel 13.

The second touch panel 13 may detect an input operation as an input operation on a touch pad, and the control unit 22 may execute the detected input operation as an operation on a screen that is displayed on the first touch panel 12. In this case, it is allowable to detect an input operation without displaying an image on the second touch panel 13. With this configuration, because an input operation on the second touch panel 13 is detected as an input operation on a touch pad, the user can perform, while holding the housing 2 with a hand, various input operations with the same hand to move the cursor appearing on the first touch panel 12, scroll the page, and move the screen.

As described in the present embodiment, the portable electronic apparatus 1 has the camera 36 near an edge that is different from the edge of the back surface 2B on which the finger rest section 2C is arranged. Therefore, even when the user holds the housing 2 by the finger rest section 2C, the lens of the camera 36 is not covered with the user's hand. With this configuration, the user can use the camera 36 easily.

As described in the present embodiment, an edge of the finger rest section 2C that is closer to the center of the back surface 2B and that extends in the longitudinal direction is sloped at an acute angle. With this configuration, the user can easily put his/her finger (especially, the end of his/her finger) on the finger rest section 2C. Therefore, the user can hold the housing 2 easily.

As described in the present embodiment, the finger rest section 2C extends in the longitudinal direction over the back surface 2B. With this configuration, the user can put his/her finger on the finger rest section 2C even when he/she holds the housing 2 by any position of a side surface on which the finger rest section 2C is formed. Therefore, the user can hold the housing 2 easily. Moreover, when the user performs, while holding the housing 2 with a hand, an input operation on the second touch panel 13 with the same hand, the user can perform an input operation while moving the hand along the side surface of the housing 2. With this configuration, the user can perform an input operation on any position of the second touch panel 13 from end to end in the longitudinal direction.

As described in the present embodiment, the finger rest section 2C is a convex-shaped section that extends from near an edge of the back surface 2B to a position on which the end of a user's finger will be put and the level of the convex section is higher than the level of a portion of the back surface 2B that is different from the finger rest section 2C (area excluding the finger rest section 2C), i.e., the finger rest section 2C is a level-increased section that extends from near an edge of the back surface 2B to a position on which the end of a user's finger will be put. Because the finger rest section 2C is an extending level-increased section, the user can hold the housing 2 easily. Moreover, because the finger rest section 2C is an extending level-increased section, the housing 2 has such a large inner space that can accommodate therein various components, such as the battery 34. In the present embodiment the finger rest section 2C is an extending level-increased section. However, the finger rest section 2C can take any shape as long as the level of a position on which a user's finger will be put is increased. The finger rest section 2C can be a level-increased section (protrusion section) formed at a position away a predetermined distance from an edge of the back surface 2B of the housing 2.

A portion of the finger rest section 2C on which the end of a user's finger will be put (edge closer to the center of the back surface 2B) is preferably away 50 mm or less from an edge of the back surface 2B, i.e., a distance L1 of FIG. 5 is preferably equal to or less than 50 mm. With this configuration, when the user holds the housing 2, the end of a user's finger is put on the finger rest section 2C properly. Therefore, the user can hold the housing 2 easily.

Moreover, the level of the finger rest section 2C or the level of the level-increased section is preferably higher than the level of a portion of the back surface 2B that is different from the finger rest section 2C (the other area) by a value equal to or greater than 4 mm and equal to or less than 6 mm, i.e., a distance D of FIG. 5 is preferably a value equal to or greater than 4 mm and equal to or less than 6 mm and, more preferably, about 5 mm. With this configuration, the user can easily nip the housing 2 with one hand. Moreover, because the step of the portion on which a user's finger will be put has a height equal to or greater than a certain value, the user can put his/her finger easily. Moreover, because the finger rest section 2C has a large inner space, it is easy to accommodate various components therein.

The housing 2 is preferably formed such that the distance on the surface between an edge of the second touch panel 13 that is closer to the center of the front surface 2A and that extends in the longitudinal direction (edge extending in the longitudinal direction) and the portion of the finger rest section 2C that is formed on the back surface 2B and on which the end of a user's finger will be put (the distance on the surface between the edge of the second touch panel 13 closer to the center of the front surface 2A and the edge of the finger rest section 2C closer to the center of the back surface 2B), i.e., a distance L2 of FIG. 5 is equal to or greater than 80 mm and equal to or less than 120 mm and, more preferably, about 100 mm. In other words, the sum of the length of the second touch panel 13 in the lateral direction, the thickness of the housing 2, and the length of the finger rest section 2C in the lateral direction is preferably equal to or greater than 80 mm and equal to or less than 120 mm and, more preferably, about 100 mm. The housing 2 is not limited to the relation of lengths that is described in the present embodiment, and the housing 2 can be various shapes by relatively changing the length of the second touch panel 13 in the lateral direction, the thickness of the housing 2, and the length of the finger rest section 2C in the lateral direction. If any of the length of the second touch panel 13 in the lateral direction, the thickness of the housing 2, and the length of the finger rest section 2C in the lateral direction is changed, the other length or thickness is changed relatively so that the sum of the lengths and the thickness becomes equal to or greater than 80 mm and equal to or less than 120 mm or about 100 mm. Because the sum is limited to a value within the above range, the user can put his/her thumb on the area where the second touch panel 13 is arranged on the housing 2, while putting his/her finger on an edge of the finger rest section 2C that is closer to the center of the back surface 2B. With this configuration, the user can hold the finger rest section 2C more easily and perform an input operation on the second touch panel 13 more easily.

The portable electronic apparatus 1 is configured to switch the orientation and the position of an operation menu (image) that is displayed on the second touch panel 13 in accordance with the orientation of the housing 2 detected by the acceleration sensor 38. In other words, the control unit 22 sets, in accordance with the orientation of the housing 2 detected by the acceleration sensor 38, the display orientation of a screen displayed on the first touch panel 12 and the display orientation of information displayed on the second touch panel 13. Because, as described above, the orientations of images that are displayed on the first touch panel 12 and the second touch panel 13 are set in accordance with the orientation of the housing 2, the images are displayed in the appropriate orientation so that the user can easily recognize them. For example, the upward direction of an image is aligned with the vertically upward direction. It is allowable to adjust the relation between the orientation of the housing 2 and the orientation of an image by a user setting.

Figure 8:
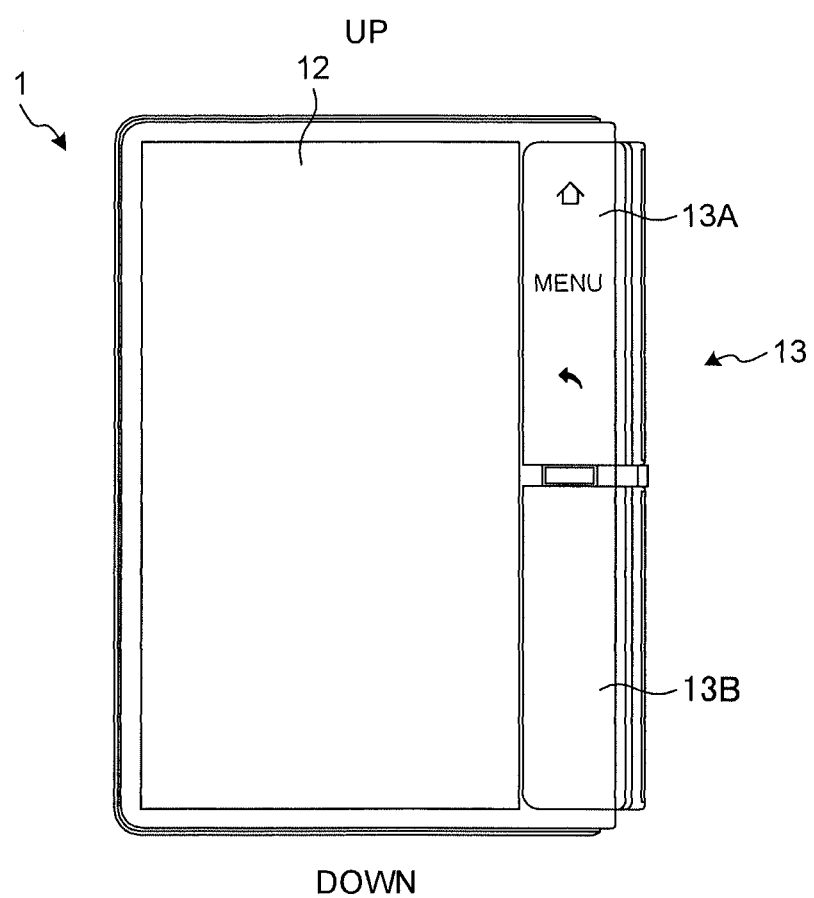
FIG. 8 is a diagram of an example of an image that is displayed on a second touch panel.
Figure 9:
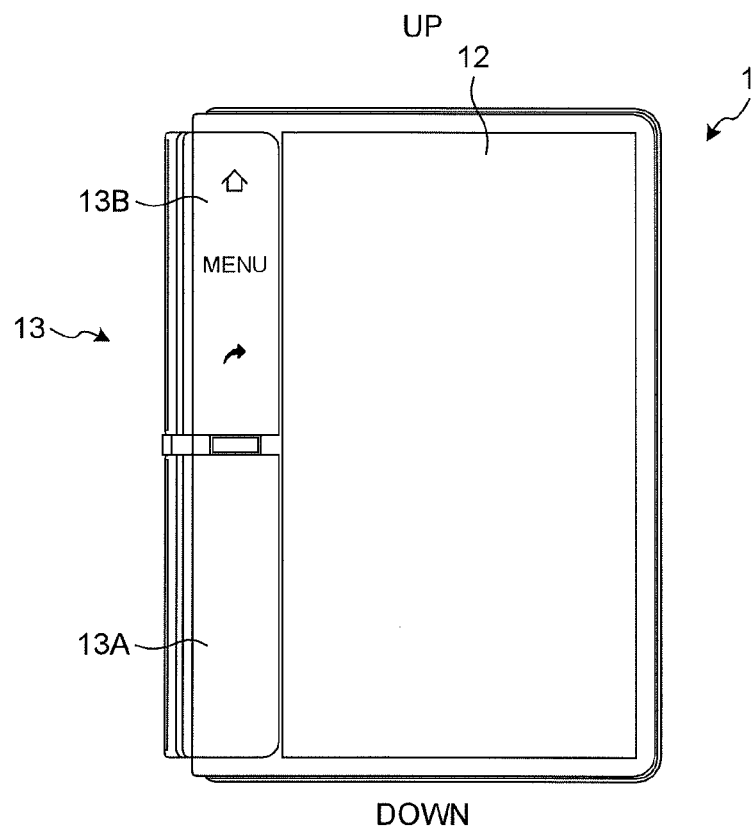
FIG. 9 is a diagram of an example of an image that is displayed on the second touch panel.
Figure 10:
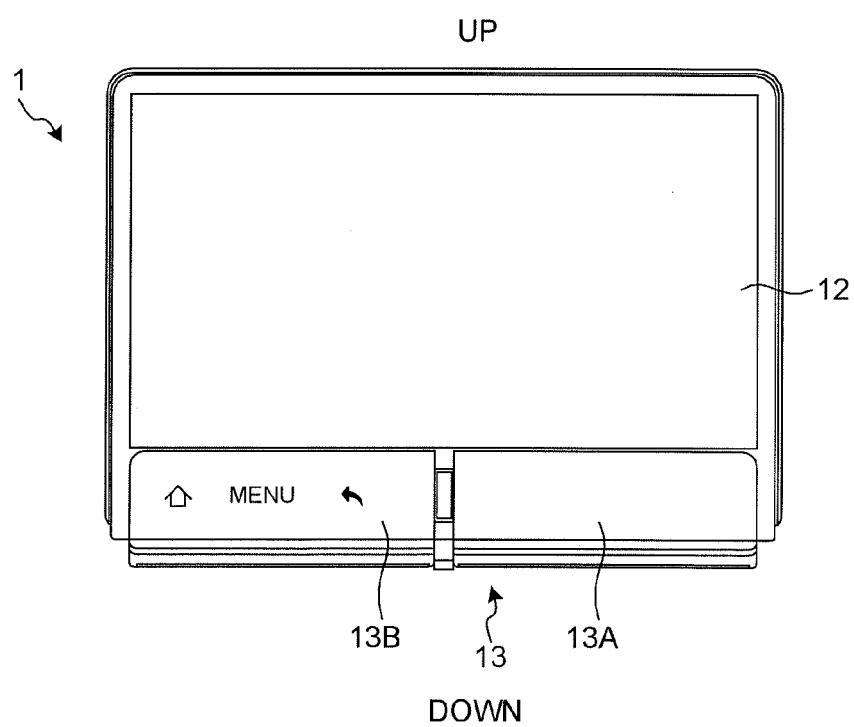
FIG. 10 is a diagram of an example of an image that is displayed on the second touch panel.

The control unit 22 is configured to display information that relates to an operation on the upper area of the second touch panel 13 (vertically upward area) preferentially. This will be explained with reference to FIGS. 8 to 10. FIGS. 8 to 10 are diagrams of examples of an image that is displayed on the second touch panel. As illustrated in FIG. 8, when the first area 13A of the second touch panel 13 is vertically upward of the second area 13B, the portable electronic apparatus 1 displays an operation menu on the first area 13A. The operation menu illustrated in FIG. 8 includes the home key, the menu key, and the return-back key. As illustrated in FIG. 9, when the second area 13B of the second touch panel 13 is vertically upward of the first area 13A, the portable electronic apparatus 1 displays the operation menu on the second area 13B. As illustrated in FIG. 10, when the first touch panel 12 is vertically upward of the second touch panel 13, the portable electronic apparatus 1 displays the operation menu on the second area 13B. In any example of FIGS. 8 to 10, the operation menu is displayed with the upper side of displayed texts and signs vertically upward. When the portable electronic apparatus 1 is arranged in the orientation as illustrated in FIG. 10, it is allowable to display the operation menu on the first area 13A.

Because, as illustrated in FIGS. 8 and 9, an operation menu is displayed on a vertically upward area of the second touch panel 13, the operation menu is displayed on an area where the user can operate, when holding the housing 2 with a hand, the operation menu easily with the same hand. With this configuration, the user can operate, when holding the housing 2 with a hand, the second touch panel 13 with the same hand easily and, therefore, the operability is improved.

The control unit 22 may be configured to display an operation menu (operation items) on the upper area of the second touch panel 13 in accordance with an image displayed on the upper area of the first touch panel 12 and displays an operation menu on the lower area of the second touch panel 13 in accordance with an image displayed on the lower area of the first touch panel 12. When, for example, images that relate to different applications are displayed on the upper area and the lower area of the first touch panel 12, respectively, an operation menu that relates to the application of the image displayed on the upper area is displayed on the upper area of the second touch panel 13 and an operation menu that relates to the application of the image displayed on the lower area is displayed on the lower area of the second touch panel 13. Because, as described above, the position of the operation menu displayed on the second touch panel 13 is decided in accordance with the position of an image (screen, window) displayed on the first touch panel 12, the portable electronic apparatus 1 allows an intuitive operation and therefore, the user can operate the portable electronic apparatus 1 easily. When an image of one application is displayed on the first touch panel 12, the control unit 22 displays, in the same manner, an operation menu that relates to a constituent element of the displayed image on the second touch panel 13 near the constituent element.

In the above embodiment, the finger rest section 2C is arranged along a longitudinal side surface of the back surface 2B. However, the edge along which the finger rest section 2C is arranged is not limited thereto. The finger rest section of the portable electronic apparatus may be arranged along a lateral side surface. In other words, the finger rest section may be arranged on an edge of the back surface that is adjacent to a lateral side surface.

In the above embodiment, the second touch panel 13 is arranged at a position on the front surface 2A to face the finger rest section 2C. However, the configuration is not limited thereto. The portable electronic apparatus 1 may have, instead of the second touch panel 13, an operation unit that is formed with physical keys. Even when the operation unit that is formed with physical keys is arranged at a position on the front surface 2A to face the finger rest section 2C, the user can operate, while holding the housing 2 with his/her finger of a hand putting on the finger rest section 2C, the operation unit that is arranged at a position on the front surface 2A to face the finger rest section 2C with the same hand. With this configuration, the user can perform an input operation, while holding the portable electronic apparatus with one hand.

In the above embodiment, for the purpose of easy input operation, the first touch panel 12 is provided on the front surface 2A. However, it is allowable to arrange a display unit instead of the first touch panel 12. In other words, the display unit arranged on the area of the first touch panel 12 may be a display unit that does not include any touch sensor.

In the above embodiment, operation items (operation menu) that correspond to an image displayed on the first touch panel 12 are displayed on the second touch panel 13 of the front surface 2A aligned in the longitudinal direction. However, the configuration is not limited thereto. The positional relation between operation items that are displayed on the second touch panel 13 can be set variously. For example, it is allowable to arrange the operation items circularly on the second touch panel 13 of the front surface 2A or in an inclined line (line inclined with respect to the longitudinal direction). If the operation items are arranged circularly, it is possible to arrange two or more operation menus at given positions such that the user easily moves, while holding the housing 2 with a hand, the end of his/her finger of the same hand between the positions. When the operation menu is arranged in an inclined line, the menu can be arranged not only in an inclined straight line but also in a staggered manner.

The advantages are that one embodiment of the invention provides a portable electronic apparatus that allows a user to perform an input operation easily, while holding the housing.

What is claimed is:

1. A portable electronic apparatus, comprising:
a housing including a first surface, a second surface that is opposite the first surface, and a convex section that is formed on an edge area of the second surface;
a first touch panel arranged on the first surface, the first touch panel configured to display an image;
a second touch panel arranged on the first surface, the second touch panel configured to detect an operation; and
a control unit configured to control the first touch panel and the second touch panel,
wherein the control unit is configured to
control the first touch panel to display
a first image on an upper area of the first touch panel, the first image associated with a first application, and
a second image on a lower area of the first touch panel, the second image associated with a second application,
control the second touch panel to display
a first operation item on an upper area of the second touch panel, the first operation item configured to operate the first application associated with the first image, and
a second operation item on a lower area of the second touch panel, the second operation item configured to operate the second application associated with the second image, and
determine the display positions of the first and second operation items on the second touch panel in accordance with the display positions of the corresponding first and second images displayed on the first touch panel in such a manner to keep a positional relationship of the first and second operation items on the second touch panel to be the same as a positional relationship of the first and second images on the first touch panel.

2. The portable electronic apparatus according to claim 1, wherein a center of gravity of the housing is in a side where the convex section is arranged.

3. The portable electronic apparatus according to claim 2, further comprising a battery accommodated in the convex section of the housing.

4. The portable electronic apparatus according to claim 1, wherein the control unit is configured to display, on the second touch panel, information indicative of at least one of date, time, remaining battery level, and radio field intensity.

5. The portable electronic apparatus according to claim 1, wherein the control unit is configured to detect an input operation on the second touch panel as an operation for a screen displayed on the first touch panel.

6. The portable electronic apparatus according to claim 1, further comprising a camera arranged near an edge of the second surface that is different from the edge near the convex section.

7. The portable electronic apparatus according to claim 1, further comprising:
a dial key for a direction instruction, the dial key located between the upper area and the lower area of the second touch panel.

8. The portable electronic apparatus according to claim 1, wherein the convex section extends in a longitudinal direction of the housing over the second surface.

9. The portable electronic apparatus according to claim 1, wherein the convex section is a convex-shaped section that extends from near an edge of the second surface to a certain position and a level of the convex section is higher than a level of the second surface excluding the convex section.

10. The portable electronic apparatus according to claim 1, wherein the second touch panel is arranged on the first surface in an area substantially opposite the convex section on the second surface.

11. The portable electronic apparatus according to claim 1, wherein the second touch panel overlaps the convex section in a thickness direction of the housing.

12. The portable electronic apparatus according to claim 1, wherein a thickness of the apparatus is greatest at the convex section.

13. The portable electronic apparatus according to claim 1, wherein the first and second images associated with the corresponding first and second applications are concurrently displayed on the first touch panel.

14. The portable electronic apparatus according to claim 1, further comprising a detector for detecting an orientation of the housing, wherein
the control unit is configured to change a display orientation of a screen displayed on the first touch panel and a display orientation of information displayed on the second touch panel in accordance with the orientation of the housing that is detected by the detector.

15. The portable electronic apparatus according to claim 14, wherein the control unit is configured to display information that relates to the operation on the upper area of the second touch panel.

16. The portable electronic apparatus according to claim 1, wherein the convex section has
an inner edge on the second surface,
a first side extending in a lateral direction of the apparatus, obliquely from the inner edge and away from the first surface,
a second side extending in the lateral direction from the first side and away from the inner edge, and
a curved, third side extending in a thickness direction of the apparatus, connecting the second side with the first surface, and defining an outer edge of the apparatus.

17. The portable electronic apparatus according to claim 16, wherein
a width of the convex section in the lateral direction is a distance from the inner edge of the convex section on the second surface to the outer edge of the apparatus, and said width is 50 mm or less,
a thickness of the convex section is a distance in the thickness direction between the second side and a portion of the second surface outside the convex section, and said thickness is from 4 mm to 6 mm, and
a sum of (i) the width of the convex section in the lateral direction, (ii) a width of the second touch panel in the lateral direction, and (iii) a thickness of the housing is from 80 mm to 120 mm.

18. A portable electronic apparatus, comprising:
a first touch panel configured to display a first image corresponding to a first application and a second image corresponding to a second application;
a second touch panel located along a side of the first touch panel; and
a controller,
wherein the second touch panel is configured to:
display a first item for operating the first application and a second item for operating the second application, and
detect a first touch on the first item and a second touch on the second item,
wherein the controller is configured to
operate the first application based on the first touch,
operate the second application based on the second touch,
control the first touch panel to position the second image related to the first image, and
control the second touch panel to position the second item related to the first item, and
wherein a first direction from the first image to the second image on the first touch panel is substantially parallel to a second direction from the first item to the second item on the second touch panel.

* * * * *